United States Patent

[11] 3,592,997

| [72] | Inventor | Philip Ian Durie<br>Thurso, Caithness, Scotland |
|---|---|---|
| [21] | Appl. No. | 593,103 |
| [22] | Filed | Nov. 9, 1966 |
| [45] | Patented | July 13, 1971 |
| [73] | Assignee | United Kingdom Atomic Energy Authority<br>London, England |
| [32] | Priority | Nov. 15, 1965 |
| [33] | | Great Britain |
| [31] | | 48477/65 |

[54] METAL FORMING
9 Claims, 2 Drawing Figs.

| [52] | U.S. Cl. | 219/137,<br>29/470, 219/61 |
|---|---|---|
| [51] | Int. Cl. | B23k 9/00 |
| [50] | Field of Search | 219/137,<br>59, 60, 61, 149, 152, 154, 162; 29/470 |

[56] References Cited
UNITED STATES PATENTS

| 3,346,717 | 10/1967 | Pugh et al. | 219/121 |
| 2,309,561 | 1/1943 | Westin et al. | 219/149 |
| 2,313,068 | 3/1943 | Heineman | 219/149 |
| 2,322,444 | 6/1943 | Heath | 219/149 |
| 2,397,717 | 4/1946 | Westin | 219/149 |
| 3,067,321 | 12/1962 | Westin et al. | 219/152 |

Primary Examiner—Joseph V. Truhe
Assistant Examiner—C. L. Albritton
Attorney—Larson, Taylor & Hinds ABSTRACT: A method of sealing a metallic tubular workpiece by rotating the workpiece relatively to a welding torch arranged transversely with respect to the axis of the workpiece, the speed of rotation of the workpiece relative to the torch being increased while the current fed to the torch is reduced so that the workpiece is cut into two portions, at least one having a sealed end closure formed by recasting of the metal of the workpiece melted by the torch.

METAL FORMING

This invention relates to metal forming and has particular application in the manufacture of nuclear reactor fuel elements.

One of the most widely used types of nuclear reactor fuel element is that in which nuclear fuel material is sheathed in a protective tube closed at its extremities by end caps. Each of the two end caps is sealed to the sheath by a circumferential butt weld formed by an argon arc-welding process. The use of these welded end caps presents difficulties when the fuel elements are of small size in cross section, such as those referred to as fuel element pins. These difficulties are associated with various factors which include the need for precision in control of weld penetration, the desirability of minimizing the zone affected by weld heat, the fact that abrupt changes in cross section occur in the immediate vicinity of the weld, and grain growth in the welded components.

According to the present invention a method of sealing a metallic tubular workpiece using a welding torch arranged transversely with respect to the axis of the workpiece is characterized in that the workpiece is supported to either side of the torch and in that with relative rotation being established between the torch and the workpiece and an arc being struck between the torch and the workpiece the speed of relative rotation is increased while the current fed to the torch is reduced, so that the workpiece is cut into two portions, at least one having a sealed end closure formed by recasting of the metal of the workpiece in the region of the arc. In order to smooth off the seal weld thus formed and to round off external and internal sharp corners between the seal weld and the main body of the workpiece is preferable to perform a second weld run with the welding torch set at the edge of the seal weld. This second weld run is also carried out under reducing current conditions and increasing speed of rotation.

The invention also resides in a workpiece sealed by the method of the preceding paragraphs.

By way of example the invention is described below in relation to its application in the manufacture of nuclear reactor fuel elements.

Figure 1:
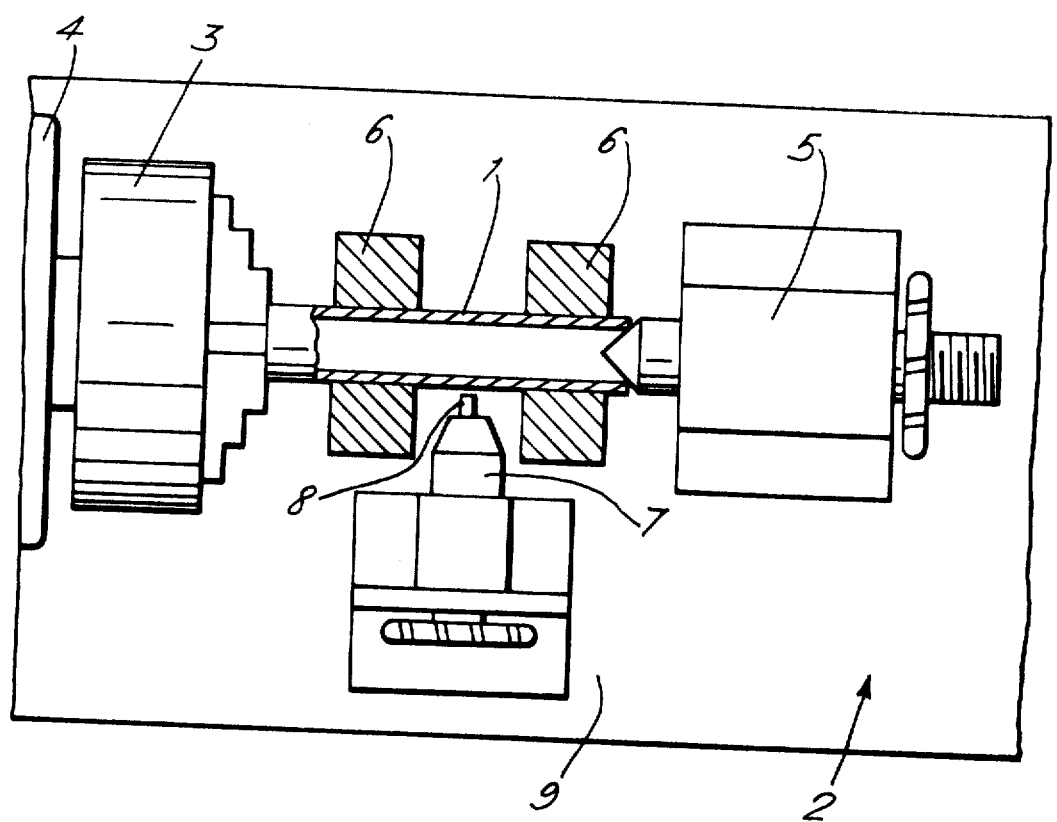
FIG. 1 is a partially schematic plan view of a conventional lathe having elements mounted thereon for carrying out the method of the present invention.
Figure 2:
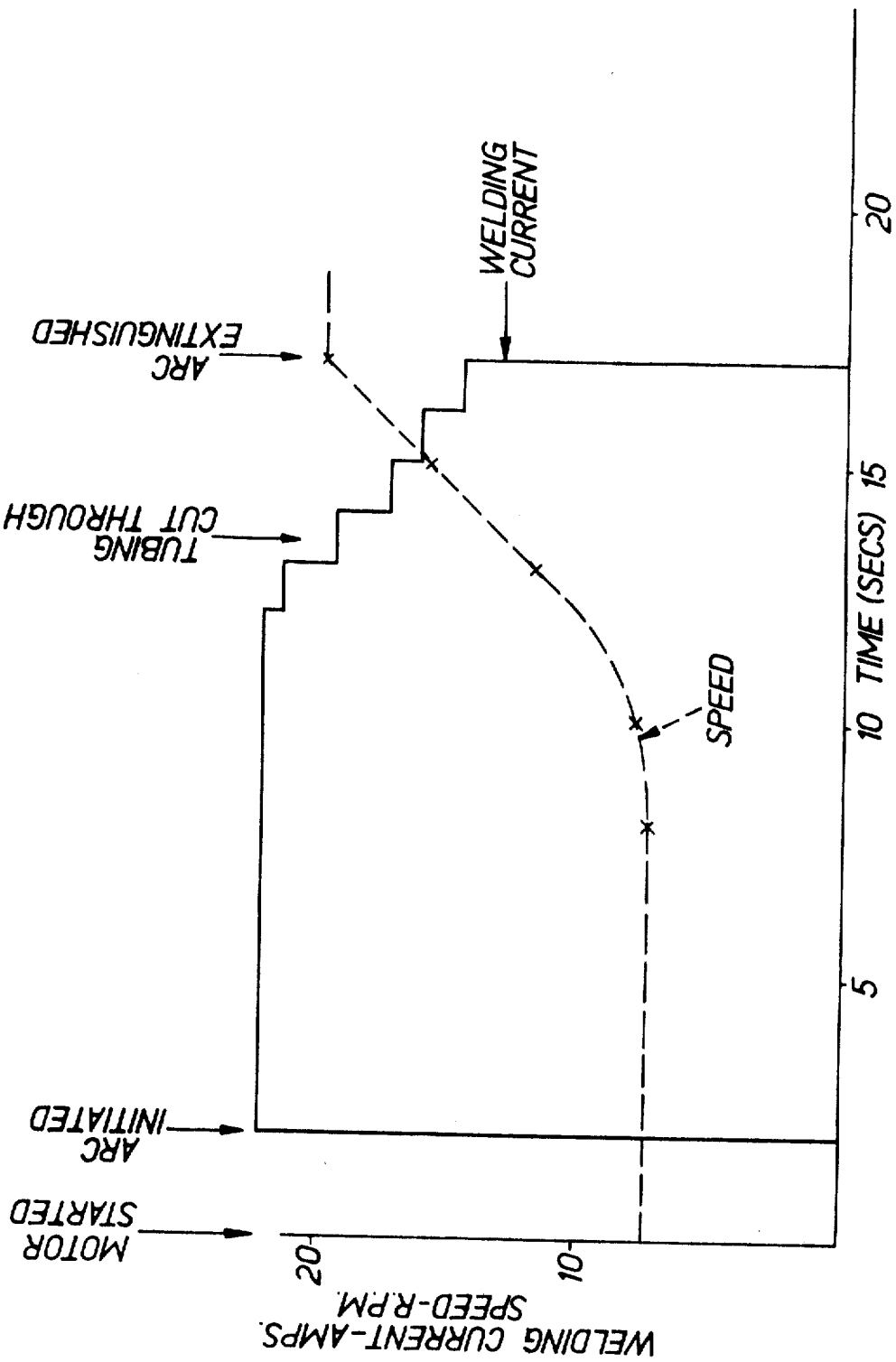
FIG. 2 illustrates a typical program for carrying out the method of the present invention.

As shown in FIG. 1 of the drawings a workpiece in the form of a length of metal tubing is used, the tubing 1 being typically made of stainless steel and having for example an internal diameter of 0.200 inches and a wall thickness of 0.015 inches. The workpiece is mounted for rotation in a welding machine in the form of a modified lathe 2, the tubing 1 being supported in passage through the chuck 3 of the lathe headstock 4 and one end also being supported in the lathe tailstock 5. The tubing 1 is also fitted with two copper chills 6. Between the two copper chills 6 a welding torch 7 is arranged transversely with respect to the axis of the workpiece, that is to say with the axis of its electrode 8 lying perpendicular to the longitudinal axis of the tubing 1. The torch 7 is of the gas-shielded type employing argon or helium and mounted from the lathe bed 9 so that it can be moved to adjust the distance between the electrode 8 and the tubing 1. The machine has a control unit enabling a programmed operation involving change of speed and current to be carried out, a typical program being represented graphically in FIG. 2.

In sealing the workpiece the tubing 1 is rotated about its longitudinal axis by the lathe drive motor while the torch 7 remains stationary, an argon or helium arc is struck between the electrode 8 and the tubing 1 while the appropriate shielding gas is fed through the workpiece and the speed of rotation of the tubing 1 is increased while the welding current fed to the torch 7 is reduced. The programmed operation used is typically as shown in the drawing. In this way the workpiece is cut into two portions, that supported by the chuck 3 having a sealed end closure formed by recasting of the metal of the tubing 1 in the region of the arc.

In order to smooth off the sealed end of the workpiece and to round off external and internal sharp corners between the sealed end and the main body of the workpiece it is preferable to carry out a second weld run on the workpiece with the torch electrode 8 set at the edge of the sealed end of the workpiece. The second weld then is also carried out with increase of speed of rotation of the workpiece while the welding current fed to the torch 7 is reduced. The following are specific examples of welding sequences carried out according to the method of the invention.

EXAMPLE I

Workpiece - Austenitic stainless steel AISI 316 tubing

Welding torch - tungsten electrode 1/32 inch diameter containing 2 percent Thoria Electrode setting - (first and second weld runs) 0.018 inch to 0.915 inch from workpiece Shielding gas flow - (first weld run only) 15 cubic feet per hour through the torch 5 cubic feet per hour through the workpiece Chill settings - Chills set 5/16 inch apart and the electrode set at one-eighth inch from the chill embracing the length of the tube which is to be sealed off

FIRST WELD

| | | | Current (amp) | | | |
|---|---|---|---|---|---|---|
| | | | Workpiece (dia. 0.230") | | Workpiece (dia. 0.325") | |
| | | | | | Horiz. | Vert. |
| Time (sec.): | Action | Speed (rev./min.) | Argon | Helium | Argon | |
| 0 | Start | 0 | 0 | 0 | 0 | 0 |
| 1 | | 0 | 0 | 0 | 0 | 0 |
| 2 | | 0 | 0 | 0 | 0 | 0 |
| 2.2 | Rotation on | 6.1 | 0 | 0 | 0 | 0 |
| 4 | Current on | 6.1 | 22.2 | 14.2 | 35.2 | 39.4 |
| 10.2 | Speed 2 | 6.45 | 22.2 | 14.2 | 35.2 | 39.4 |
| 12.2 | Speed 3 | 6.8 | 22.2 | 14.2 | 35.2 | 39.4 |
| 14.0 | Current step 1 | 6.8 | 21.8 | 13.8 | 34.8 | 39.0 |
| 15.0 | Current step 2 | 6.8 | 19.6 | 12.6 | 32.8 | 37.0 |
| 15.2 | Speed 4 | 10.3 | 19.6 | 12.6 | 32.8 | 37.0 |
| 16.0 | Step 3 | 10.3 | 18.4 | 11.8 | 31.6 | 35.8 |
| 17.0 | Step 4 | 10.3 | 17.2 | 11.0 | 30.4 | 34.6 |
| 17.2 | Speed 5 | 13.6 | 17.2 | 11.0 | 30.4 | 34.6 |
| 18.0 | Step 5 | 13.6 | 16.0 | 9.6 | 29.0 | 33.2 |
| 18.2 | Speed 6 | 17.1 | 16.0 | 9.6 | 29.0 | 33.2 |
| 19.0 | Current off | 17.1 | 0 | 0 | 0 | 0 |
| 19.4 | Rotation off | 0 | 0 | 0 | 0 | 0 |
| 21.0 | Reset | 0 | 0 | 0 | 0 | 0 |

SECOND WELD

| Action | Speed (rev./min.) | Current (amp) Workpiece (dia. 0.230") Argon | Current (amp) Workpiece (dia. 0.230") Helium | Workpiece (dia. 0.325"), argon |
|---|---|---|---|---|
| Time (sec): | | | | |
| 0............ Start............ | 0 | 0 | 0 | 0 |
| 1.................................... | 0 | 0 | 0 | 0 |
| 2.................................... | 0 | 0 | 0 | 0 |
| 3............ Current on...... | 0 | 5.2 | 5.2 | 12.8 |
| 5.2.......... Rotation on..... | 4.75 | 5.2 | 5.2 | 12.8 |
| 9.2.......... Speed 2......... | 5.1 | 5.2 | 5.2 | 12.8 |
| 11.2......... Speed 3......... | 5.45 | 5.2 | 5.2 | 12.8 |
| 13.0......... Current step 1.. | 5.45 | 4.8 | 4.8 | 12.0 |
| 13.2......... Speed 4......... | 5.75 | 4.8 | 4.8 | 12.0 |
| 14.0......... Step 2.......... | 5.75 | 4.4 | 4.4 | 11.2 |
| 15.0......... Step 3.......... | 5.75 | 3.8 | 4.0 | 9.6 |
| 15.2......... Speed 5......... | 6.85 | 3.8 | 4.0 | 9.6 |
| 20.0......... Step 4.......... | 6.85 | 3.4 | 3.6 | 8.8 |
| 21.0......... Step 5.......... | 6.85 | 2.4 | 3.2 | 6.2 |
| 22.2......... Speed 6......... | 10.9 | 2.4 | 3.2 | 6.2 |
| 24.0......... Current off..... | 10.9 | 0 | 0 | 0 |
| 24.2......... Rotation off.... | 0 | 0 | 0 | 0 |
| 24.4......... Reset........... | 0 | 0 | 0 | 0 |

EXAMPLE II

The basic details are as for example I with the exception of the chill settings for the first weld run. In this case for the first weld run the chills are set 7/16 inch apart and the electrode set at 1/16 inch from the chill embracing the length of tube which is to be sealed off.

FIRST WELD

| Action | Speed (rev./min.) | Current amps (workpiece dia. 0.230"), argon |
|---|---|---|
| Time (sec.): | | |
| 0............ Start............ | 0 | 0 |
| 1.................................... | 0 | 0 |
| 2.................................... | 0 | 0 |
| 2.2.......... Rotation on..... | 6.1 | 0 |
| 4............ Current on...... | 6.1 | 19.2 |
| 10.2......... Speed 2......... | 6.45 | 19.2 |
| 12.2......... Speed 3......... | 6.8 | 19.2 |
| 14........... Current step 1.. | 6.8 | 18.8 |
| 15........... Current step 2.. | 6.8 | 16.8 |
| 15.2......... Speed 4......... | 10.3 | 16.8 |
| 16........... Current step 3.. | 10.3 | 15.6 |
| 17........... Current step 4.. | 10.3 | 14.4 |
| 17.2......... Speed 5......... | 13.6 | 14.4 |
| 18........... Current step 5.. | 13.6 | 12.8 |
| 18.2......... Speed 6......... | 17.1 | 12.8 |
| 19........... Current off..... | 17.1 | 0 |
| 19.4......... Rotation off.... | 0 | 0 |
| 21........... Reset........... | 0 | 0 |

SECOND WELD

| Action | Speed (rev./min.) | Current amps (workpiece dia. 0.230"), argon |
|---|---|---|
| Time (sec.): | | |
| 0............ Start............ | 0 | 0 |
| 1.................................... | 0 | 0 |
| 2.................................... | 0 | 0 |
| 2.2.......... Current on...... | 0 | 5.2 |
| 4............ Rotation on..... | 4.75 | 5.2 |
| 10.2......... Speed 2......... | 5.1 | 5.2 |
| 12.2......... Speed 3......... | 5.45 | 5.2 |
| 14........... Current step 1.. | 5.45 | 6.2 |
| 15........... Speed 4......... | 5.75 | 6.2 |
| 15.2......... Current step 2.. | 5.75 | 5.8 |
| 16........... Current step 3.. | 5.75 | 5.2 |
| 17........... Speed 5......... | 6.85 | 5.2 |
| 17.2......... Current step 4.. | 6.85 | 4.8 |
| 18........... Current step 5.. | 6.85 | 3.8 |
| 18.2......... Speed 6......... | 10.9 | 3.8 |
| 19........... Current off..... | 10.9 | 0 |
| 19.4......... Rotation off.... | 0 | 0 |
| 21........... Reset........... | 0 | 0 |

EXAMPLE III

The basic details are as for example I.

TABLE EXAMPLE III

| Workpiece 0.23" dia. welding in argon | | First weld | | | Second weld | | |
|---|---|---|---|---|---|---|---|
| Time (sec.) | Action | Current (amp) | Speed (sec./rev.) | Time (sec.) | Action | Current (amp) | Speed (sec./rev.) |
| 0............ | Start............ | 0 | 0 | 0 | Start............ | 0 | 0 |
| 1............ |  | 0 | 0 | 1 |  | 0 | 0 |
| 2............ |  | 0 | 0 | 2 |  | 0 | 0 |
| 3............ |  | 0 | 0 | 3 |  | 0 | 0 |
| 3.2.......... | Rotation on..... | 0 | 9.8 | 3.8 | Rotation on..... | 0 | 12.6 |
| 4.0........... | Current on...... | 21.8 | 9.8 | 4.0 | Current on...... | 21.8 | 12.6 |
| 10.2.......... | Speed 2......... | 21.8 | 9.3 | 4.2 | Step 1.......... | 15.8 | 12.6 |
| 12.2.......... | Speed 3......... | 21.8 | 8.8 | 4.4 | Step 2.......... | 12.2 | 12.6 |
| 14.0.......... | Step 1.......... | 15.8 | 8.8 | 4.6 | Step 3.......... | 10.8 | 12.6 |
| 15.0.......... | Step 2.......... | 12.2 | 8.8 | 10.2 | Speed 2......... | 10.8 | 11.8 |
| 15.2.......... | Speed 4......... | 12.2 | 5.8 | 12.2 | Speed 3......... | 10.8 | 11.0 |
| 16.0.......... | Step 3.......... | 10.8 | 5.8 | 15.2 | Speed 4......... | 10.8 | 9.8 |
| 17.0.......... | Step 4.......... | 9.4 | 5.8 | 16.0 | Step 4.......... | 9.4 | 9.8 |
| 17.2.......... | Speed 5......... | 9.4 | 4.4 | 17.2 | Speed 5......... | 9.4 | 7.3 |
| 18.0.......... | Step 5.......... | 8.0 | 4.4 | 19.2 | Speed 6......... | 9.4 | 5.8 |
| 19.0.......... | Current off..... | 0 | 4.4 | 20.0 | Step 5.......... | 8.0 | 5.8 |
| 20.0.......... | Rotation off.... | 0 | 0 | 22.0 | Current off..... | 0 | 0 |
| 21.0.......... | Reset........... | 0 | 0 | 23.0 | Rotation off.... | 0 | 0 |
|  |  |  |  | 24.0 | Reset........... | 0 | 0 |

EXAMPLE IV

The workpiece used in this example was of the nickel based alloy Nimonic PE16, in the form of tubing.

FIRST WELD

| Action | Current (amp), argon | Speed (rev./min.) |
|---|---|---|
| Time (sec.): | | |
| 0 ............ Audible warning ...... | | |
| 1 ............ do .................... | | |
| 2 ............ do .................... | 0 | 0 |
| 2.2 .......... Rotation on ........... | 0 | 0 |
| 4.0 .......... Current on ............ | 0 | 6.1 |
| 10.2 ......... Speed 2 ................ | 18.0 | 6.1 |
| 12.2 ......... Speed 3 ................ | 18.0 | 6.5 |
| 14.0 ......... Step 1 ................. | 18.0 | 6.8 |
| 15.0 ......... Step 2 ................. | 17.6 | 6.8 |
| 15.2 ......... Speed 4 ................ | 15.6 | 6.8 |
| 16.0 ......... Step 3 ................. | 15.6 | 10.3 |
| 17.0 ......... Step 4 ................. | 14.4 | 10.3 |
| 17.2 ......... Speed 5 ................ | 13.2 | 10.3 |
| 18.0 ......... Step 5 ................. | 13.2 | 13.6 |
| 19.0 ......... Step 6 ................. | 11.8 | 13.6 |
| 20.0 ......... Step 7 ................. | 9.0 | 13.6 |
| 20.2 ......... Speed 6 ................ | 6.2 | 13.6 |
| 21.0 ......... Step 8 ................. | 6.2 | 13.6 |
| 22.2 ......... Speed 7 ................ | 4.8 | 16.6 |
| 23.6 ......... Current off ............ | 4.8 | 16.6 |
| 25.4 ......... Rotation off ........... | 0 | 2.0 |
| 25.6 ......... Reset .................. | 0 | 2.0 |
| | 0 | 0 |

SECOND WELD

| Action | Current (amp), argon | Speed (sec./rev.) |
|---|---|---|
| Time (sec.): | | |
| 0 ............ Audible warning ...... | | |
| 1 ............ do .................... | 0 | 0 |
| 2 ............ do .................... | 0 | 0 |
| 3 ............ Current on ............ | 0 | 0 |
| 5.2 .......... Rotation on ........... | 4.6 | 0 |
| 9.2 .......... Speed 2 ................ | 4.6 | 4.75 |
| 11.2 ......... Speed 3 ................ | 4.6 | 5.1 |
| 13.0 ......... Step 1 ................. | 4.6 | 5.45 |
| 13.2 ......... Speed 4 ................ | 4.2 | 5.45 |
| 14.0 ......... Step 2 ................. | 4.2 | 5.75 |
| 15.0 ......... Step 3 ................. | 3.8 | 5.75 |
| 15.2 ......... Speed 5 ................ | 3.0 | 5.75 |
| 20.0 ......... Step 4 ................. | 3.0 | 6.8 |
| 21.0 ......... Step 5 ................. | 2.4 | 6.8 |
| 22.2 ......... Speed 6 ................ | 2.0 | 6.8 |
| 24.0 ......... Current off ............ | 2.0 | 10.9 |
| 24.2 ......... Rotation off ........... | 0 | .9 |
| 24.4 ......... Reset .................. | 0 | 0 |
| | 0 | 0 |

I claim:

1. A method of sealing a metallic tubular workpiece using a welding torch arranged transversely with respect to the axis of the workpiece characterized in that the workpiece is supported to either side of the torch and in that with relative rotation being established between the torch and the workpiece and an arc being struck between the torch and the workpiece, the relative speed of rotation is increased while the current fed to the torch is reduced so that the workpiece is cut into two portions, at least one having a sealed end closure formed by recasting of the metal of the workpiece in the region of the arc.

2. A method of sealing a metallic tubular workpiece as claimed in claim 1 wherein the workpiece is fitted either side of the torch with metal chills.

3. A method of sealing a metallic tubular workpiece as claimed in claim 1 wherein a second weld run is made with the torch set at the edge of the sealed end closure as formed by the method of claim 1, an arc being struck between the torch and the edge of the sealed end closure, and relative rotation being established between the workpiece and the torch, the relative speed of rotation of the torch and workpiece being increased while the current fed to the torch is reduced.

4. A tubular workpiece having a sealed end closure made by the method of claim 1.

5. A tubular workpiece having a sealed end closure made by the method of claim 2.

6. A tubular workpiece having a sealed end closure made by the method of claim 3.

7. A method of sealing a metallic tubular nuclear reactor fuel element sheath using a welding torch arranged transversely with respect to the axis of the sheath characterized in that the sheath is supported to either side of the torch and in that with relative rotation being established between the torch and the sheath and an arc being struck between the torch and the sheath, the relative speed of rotation is increased while the current fed to the torch is reduced so that the sheath is cut into two portions, at least one having a sealed end closure formed by recasting of the metal of the sheath in the region of the arc.

8. A method of sealing a metallic tubular nuclear reactor fuel element sheath as claimed in claim 7 wherein the sheath is fitted either side of the torch with metal chills.

9. A method of sealing a metallic tubular nuclear reactor fuel element sheath as claimed in claim 7 wherein a second weld run is made with the torch set at the edge of the sealed end closure as formed by the method of claim 7, an arc being struck between the torch and the edge of the sealed end closure, and relative rotation being established between the sheath and the torch, the relative speed of rotation of the torch and sheath being increased while the current fed to the torch is reduced.